(12) United States Patent
Ikeda

(10) Patent No.: US 7,869,103 B2
(45) Date of Patent: Jan. 11, 2011

(54) IMAGE READING DEVICE CONFIGURATION FOR AN IMAGE READING UNIT AND A DOCUMENT HOLDER

(75) Inventor: Akihiro Ikeda, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1422 days.

(21) Appl. No.: 11/138,397

(22) Filed: May 27, 2005

(65) Prior Publication Data

US 2005/0264854 A1 Dec. 1, 2005

(30) Foreign Application Priority Data

May 27, 2004 (JP) ............................. 2004-158235

(51) Int. Cl.
*H04N 1/04* (2006.01)
*H04N 1/40* (2006.01)

(52) U.S. Cl. .................. 358/498; 358/496; 358/449; 358/474

(58) Field of Classification Search ................. None
See application file for complete search history.

(56) References Cited

U.S. PATENT DOCUMENTS

| 5,629,725 | A | | 5/1997 | Buican |
| 5,764,382 | A | | 6/1998 | Shiraishi |
| 5,880,852 | A | * | 3/1999 | Asano et al. ............... 358/296 |
| 5,903,365 | A | | 5/1999 | Iwata et al. |
| 6,147,778 | A | * | 11/2000 | Yamada et al. ............. 358/474 |
| 6,507,418 | B1 | | 1/2003 | Chen |
| 7,088,475 | B1 | * | 8/2006 | Terashima et al. .......... 358/448 |
| 7,149,011 | B2 | * | 12/2006 | Kawamura et al. .......... 358/496 |
| 7,170,654 | B2 | | 1/2007 | Sawada |
| 2002/0097450 | A1 | * | 7/2002 | Yokota et al. ............... 358/474 |
| 2002/0105686 | A1 | | 8/2002 | Hasegawa et al. |
| 2002/0171880 | A1 | | 11/2002 | Yui et al. |
| 2003/0053184 | A1 | | 3/2003 | Takase |
| 2003/0076552 | A1 | | 4/2003 | Lo et al. |
| 2003/0231360 | A1 | * | 12/2003 | Jo .............................. 358/500 |

FOREIGN PATENT DOCUMENTS

EP 1220527 A 7/2002

(Continued)

OTHER PUBLICATIONS

JP Office Action Dec. 18, 2007, JP Appln. No. 2004-158235.

*Primary Examiner*—Mark K Zimmerman
*Assistant Examiner*—Ming Hon
(74) *Attorney, Agent, or Firm*—Banner & Witcoff, Ltd.

(57) ABSTRACT

An image reading device capable of correctly reading an image on a document is provided without the need to increase the size of an upper cover, etc. of the device. A CIS (Contact Image Sensor) is supported by holders and support shafts to be movable toward the upper cover (rib) and is biased toward the rib by compression springs. In this configuration, the rib for holding the document is not required to be installed as a movable component and there is no need to provide a space for allowing the rib to move or providing the upper cover with a mechanism for allowing the rib to move, which can avoid the need to increase the size of the upper cover.

16 Claims, 7 Drawing Sheets

FOREIGN PATENT DOCUMENTS

| | | |
|---|---|---|
| JP | 62-203558 U | 12/1987 |
| JP | 2-044463 U | 3/1990 |
| JP | 5-043662 U | 6/1993 |
| JP | 7-297995 A | 11/1995 |
| JP | 7-321971 A | 12/1995 |
| JP | 10-145548 A | 5/1996 |
| JP | 8-336004 A | 12/1996 |
| JP | 9-209643 A | 8/1997 |
| JP | 9-270884 A | 10/1997 |
| JP | 11-341219 A | 12/1999 |
| JP | 2000-115430 A | 4/2000 |
| JP | 2001-320526 A | 11/2001 |
| JP | 2002-320078 A | 10/2002 |
| JP | 2003-087505 A | 3/2003 |
| JP | 2003-121947 A | 4/2003 |
| JP | 2003-125138 A | 4/2003 |
| JP | 2003-125140 A | 4/2003 |

* cited by examiner

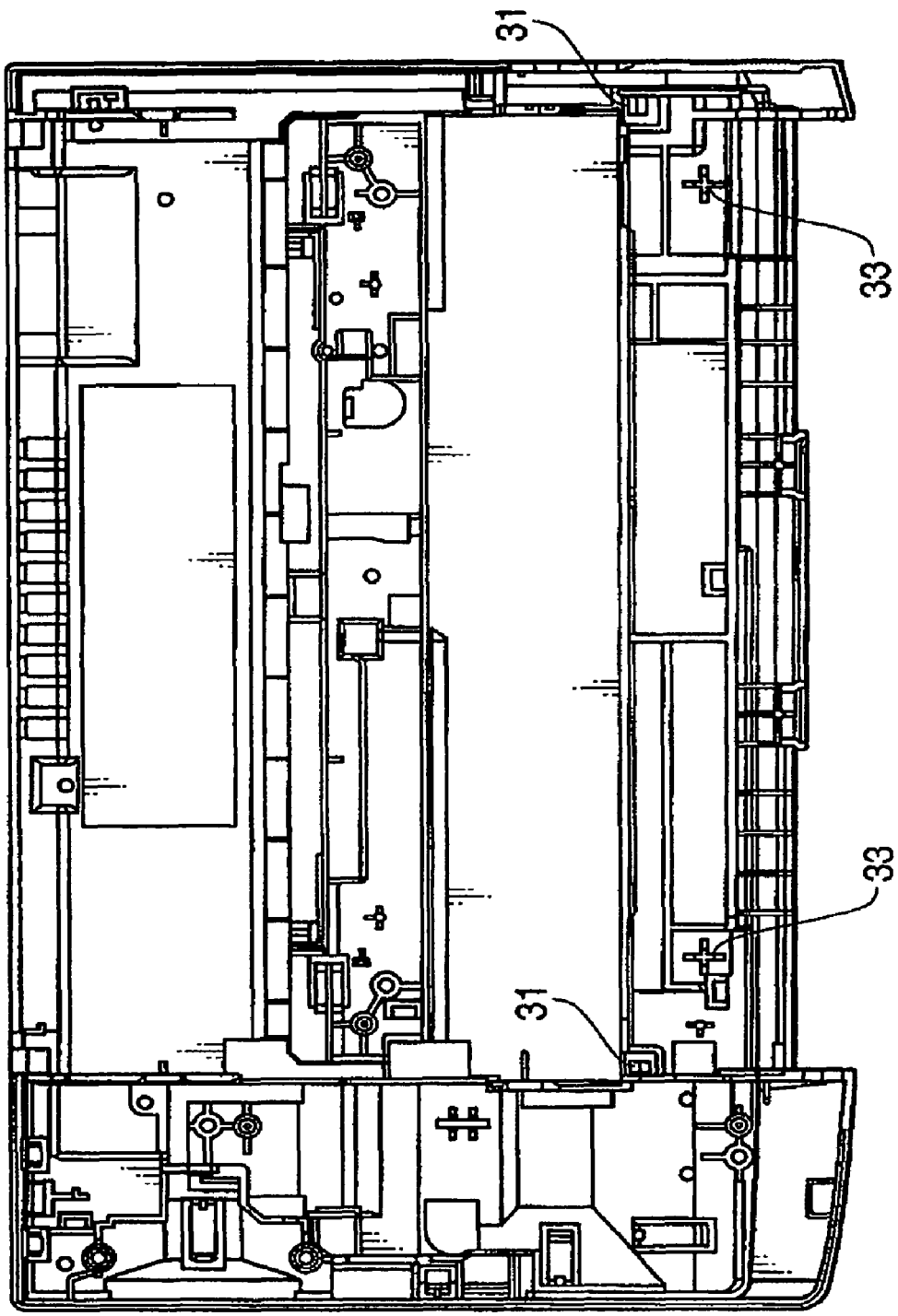

US 7,869,103 B2

IMAGE READING DEVICE CONFIGURATION FOR AN IMAGE READING UNIT AND A DOCUMENT HOLDER

CROSS REFERENCE TO RELATED APPLICATION

This application claims priority from Japanese Patent Application No. 2004-158235, filed on May 27, 2004, the entire subject matters of the application are incorporated herein by reference thereto.

BACKGROUND OF THE INVENTION

1. Technical Field

Aspects of the invention relate to an image reading device used for imaging apparatuses such as facsimile machines, scanners, and copiers.

2. Related Art

Image reading devices have been used for imaging apparatuses such as facsimile machines, scanners, copiers, and the like. An example of such an image reading device is illustrated in FIG. 7, which is a central cross-sectional view showing the internal configuration of a facsimile machine 80. In FIG. 7, a two-dot chain line 81 indicates a feeding path of a document 82. An image on the document 82 being fed along the feeding path 81 is read by a CIS (Contact Image Sensor) 84. The CIS 84 is fixed on a lower cover 85, while the document 82 is held between the CIS 84 and a document holder 86 which is placed above the CIS 84. The document holder 86 is supported by an upper cover 88 to be substantially movable in the vertical direction in FIG. 7 and is biased downward by a compression spring 90. A similar structure is disclosed in Japanese Patent Provisional Publication No.2003-125140, in which a white reference board is provided and is urged toward the CIS.

By biasing of the movable document holder 86 or white reference board toward the CIS 84, the document is pressed against the CIS 84, and positioned within the depth of field of the CIS 84.

However, in the above techniques in which the member placed to face the CIS 84 (the document holder 86 in the technique of FIG. 7 or the white reference board in Japanese Patent Provisional Publication No.2003-125140) is required to be movable and urged toward the CIS 84, a space for allowing the movement of the member has to be provided and a mechanism for supporting the member to be movable has to be provided to the upper cover 88, resulting in an increase in the size of the upper cover 88.

SUMMARY OF THE INVENTION

According to at least some aspects, the present invention is directed to an image reading device capable of correctly reading images on documents can be provided without the need to increase the size of the upper cover of the device.

BRIEF DESCRIPTION OF THE DRAWINGS

FIG. 3 is a plan view of a lower cover of the facsimile machine shown in FIG. 1;

DETAILED DESCRIPTION

Figure 1:
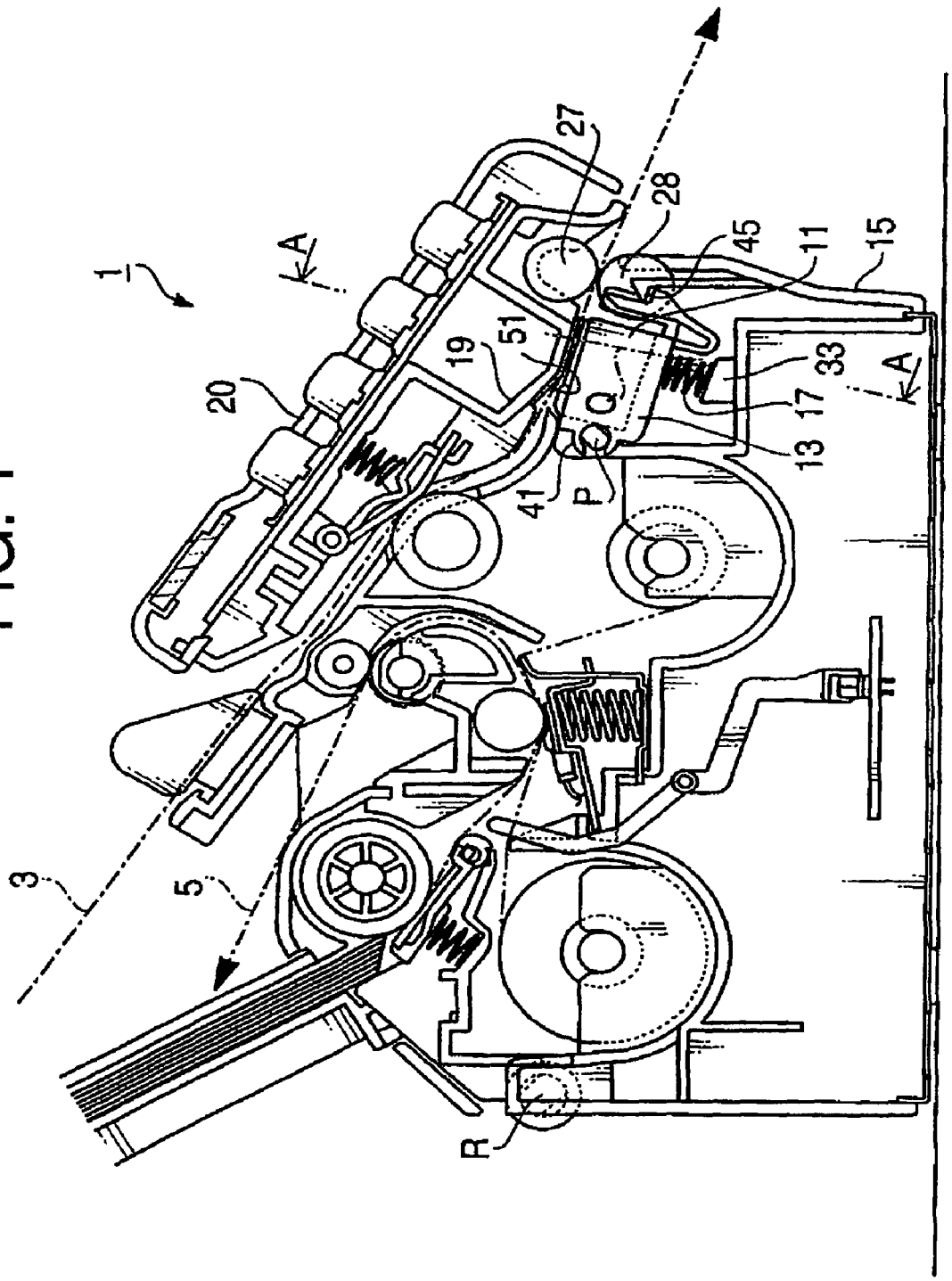
FIG. 1 is a central cross-sectional view showing an internal configuration of a facsimile machine as an image reading device in accordance with an illustrative embodiment of the present invention.

General Overview of Aspects of the Invention

The following describes general aspects of the invention that may or may nor be included in various embodiments/modifications. Also, it is noted that various connections are set forth between elements in the following description. It is noted that these connections in general and, unless specified otherwise, may be direct or indirect and that this specification is not intended to be limiting in this respect.

In accordance with an aspect of the present invention, there is provided an image reading device for reading an image formed on a document being fed, comprising: an image reading unit which reads the image formed on the document; a document holder placed to face the image reading unit to hold the document being fed, between the image reading unit and the document holder; a supporting mechanism which supports the image reading unit to be movable toward the document holder; and a biasing unit which biases the image reading unit toward the document holder.

In the image reading device configured as above, the image reading unit (CIS (Contact Image Sensor), for example) is supported by the supporting mechanism to be movable toward the document holder and is biased toward the document holder by the biasing unit. Therefore, the document holder is not required to be installed as a movable component and there is no need of securing a space for allowing the movement of the document holder or providing the upper cover with a mechanism for letting the document holder be movable. Thus, the increasing of the size of the upper cover, etc. can be avoided.

The document holder may be provided with a white member to allow the image reading unit to read a white color.

In the image reading device configured as above, it is possible to let the image reading unit read and recognize a white color. For example, as the white member, the aforementioned white reference board, a piece of white tape, the upper cover painted white, etc. can be employed.

The supporting mechanism may include a support shaft provided to a main body of the image reading device to extend in a direction orthogonal to a document feeding direction to support the image reading unit and a holding part provided to the image reading unit to hold the support shaft.

In the image reading device configured as above, the image reading unit is installed to be rotatable by the support shaft and the holding part, by which the configuration can be simplified, the image reading unit can be moved toward the document holder smoothly, and the positioning of the image reading unit can be made with ease. On the other hand, configuring the image reading device to let the image reading unit move in parallel with the document holder can involve various problems, such as complications with a mechanism for translating the image reading unit, difficulty in maintaining the parallelism, tilting of the image reading unit and difficulty in positioning the image reading unit. Incidentally, the support shaft may either be one shaft orthogonal to the document feeding direction or two shafts (placed in the vicinity of both ends of the image reading unit respectively, for example). The holding part may either be provided to the image reading unit directly or via another element.

The image reading device may further include a holder including the holding part and being directly fixed on the image reading unit to hold the image reading unit; an engaging part protruding from a part of the holder opposite to the holding part with respect to the image reading unit; and an engaged part provided to the main body of the image reading device to restrict a rotating position of the image reading unit by engaging with the engaging part when the document holder is apart from the image reading unit.

In the image reading device configured as above, the image reading unit can be installed in the main body of the device with ease. Specifically, the installation is completed by letting the holding part hold the support shaft, rotating the image reading unit in the direction against the biasing force of the biasing unit, and letting the engaging part engage with the engaged part.

The image reading unit may include image pickup devices arranged in a direction orthogonal to the document feeding direction. The holding part may be placed on an upstream side of the image pickup devices in regard to the document feeding direction.

In the image reading device configured as above, the image pickup devices of the image reading unit are placed on the downstream side of the holding part in the document feeding direction. Therefore, the friction between the document and the image reading unit serves as a slight force rotating the image reading unit in a direction separating from the document holder, which results in the document being fed smoothly.

The image reading device may further include a pair of feeding rollers fixed to the main body of the image reading device to feed the document, the image reading unit is implemented by a reading frame extending in a direction orthogonal to the document feeding direction, and the holder is implemented by a pair of frame receiving parts holding both ends of the reading frame in a direction orthogonal to the document feeding direction.

In the image reading device configured as above, the image reading unit is configured as the reading frame and both ends of the reading frame are held by a pair of frame receiving parts, by which the parallel relationship between the image reading unit and the pair of feeding rollers can be ensured easily.

Each of the frame receiving parts includes a base on which each end of the reading frame is mounted and a pair of walls extending upward from the base to face each other in the document feeding direction, and one of the walls situated on a downstream side in the document feeding direction has an upper edge formed to be able to make contact with the document to support the document.

In the image reading device configured as above, the document being fed is supported by the upper edges of the walls of the frame receiving parts, which prevents the document from being fed to improper positions (e.g. under the image reading unit). The upper edges supporting the document are those of the walls of the frame receiving parts situated on the downstream side in the document feeding direction. The moving distance of the upper edges of the walls on the downstream side is longer than that of upper edges of the walls on the upstream side since the holding part is placed on the upstream side of the image pickup devices (reading frame). Since the document supported on the upper edges moves a longer distance, the upper edges move concurrently with the movement of the image reading unit supported by the supporting mechanism) and the document can be supported stably at all times.

The pair of feeding rollers may be placed on the downstream side of the walls of the frame receiving parts situated on the downstream side in the document feeding direction to adjoin the walls.

In the image reading device configured as above, the document after being read by the image pickup devices of the reading frame is first supported by the upper edges of the walls situated on the downstream side in the document feeding direction and then fed by the pair of feeding rollers, which results in the image reading, supporting and feeding of the document being carried out with high stability.

The engaging part may be implemented by an elastic arm part provided to the holder to adjoin the wall of the frame receiving part situated on the downstream side. The elastic arm part may include an inclined face capable of making contact with the engaged part and a regulating face capable of engaging with the engaged part to restrict the rotating position of the image reading unit when the engaged part climbs over the inclined face.

In the image reading device configured as above, the image reading unit can be installed in the main body of the image reading device with ease. Specifically, by rotating the image reading unit in a direction against the biasing force of the biasing unit, the engaged part first makes contact with the inclined face and then climbs over the inclined face, which results in the regulating face engaging with the engaged part and thereafter the rotating position of the image reading unit being restricted. The installation of the image reading unit in the main body is completed easily as above.

The wall of each frame receiving part situated on the upstream side in the document feeding direction and each end of the reading frame are joined together by use of a boss formed on one of them and an engagement hole formed on the other to engage with the boss.

In the image reading device configured as above, the reading frame and the frame receiving parts are joined together using the bosses (or engagement holes) formed on the walls of the frame receiving parts and the engagement holes (or bosses) formed on the reading frame. Therefore, the reading frame and the frame receiving parts can be joined together with ease. Since the walls provided with the bosses (or engagement holes) are those situated on the upstream side in the document feeding direction (not the walls on the downstream side supporting the document with their upper edges), the configuration of each frame receiving part can be simplified. Especially in the aforementioned configuration having the elastic arm part adjoining the wall on the downstream side, the complexity of the configuration of each frame receiving part can be reduced effectively.

The support shaft may have a sectional form (in a plane orthogonal to its central axis) like an ellipse which is made by removing two peripheral parts from a circle along two parallel lines at the same distance from the central axis, and the holding part may have an opening capable of engaging with a part of the support shaft having the elliptical sectional form.

In the image reading device configured as above, letting the holding part hold the support shaft is completed easily, by engaging the part of the support shaft having the elliptical sectional form with the opening of the holding part.

The image reading device may further include an upper cover covering the top of the main body of the image reading device and being provided with the document holder.

In the image reading device configured as above, the document holder is not required to be installed as a movable component with respect to the upper cover, which avoids the need to increase the size of the upper cover.

The upper cover may be configured to be openable and closable with respect to the main body, and a supporting point of the openable/closable upper cover is situated on the same side of the image reading unit as the support shaft in the document feeding direction.

In the image reading device configured as above, the supporting point of the openable/closable upper cover is situated on the upstream side of the image reading unit in the document feeding direction. Therefore, the friction between the document and the document holder (with the upper cover) serves as a slight force rotating the upper cover (document holder) in a direction separating from the image reading unit, which results in the document being fed smoothly.

The image reading device may further include a clearance forming structure which forms prescribed clearance between the document holder and the image reading unit.

In the image reading device configured as above, soft paper can be fed more smoothly compared to cases where no clearance is formed between the document holder and the image reading unit. Incidentally, the clearance forming structure maintains the distance between the image reading unit and the document within the depth of field of the image reading unit.

The clearance forming structure may be implemented by a pair of projections integrally formed on the document holder to be able to make contact with a reading surface of the image reading unit.

In the image reading device configured as above, the clearance forming structure making smooth feeding of soft paper possible can be realized by projections.

According to other aspects of the invention, there is provided an image reading device that reads an image formed on a document being fed, which is provided with a lower body, an upper body which can be opened/closed with respect to the lower body, a part of the document path being defined between the upper body and the lower body. The image reading device further includes an image reading unit provided to one of the upper body and the lower body, a platen member provided to an other one of the upper body and the lower body, the document being nipped between the image reading unit and the platen when the image is read, and a biasing unit which biases one of the imaging reading unit and the platen member, which is provided to the lower body, toward the document holder.

According to the configuration above, the image reading unit or the platen, which is provided to the lower body of the image reading device is biased toward the other. Therefore, a biasing mechanism need not be provided to the upper body, and the upper body can be configured to be compact in size.

Embodiment

Referring now to the drawings, a description will be given in detail of a facsimile machine according to an illustrative embodiment of the present invention.

FIG. 1 is a central cross-sectional view showing an internal configuration of a facsimile machine 1 employing an image reading device according to an illustrative embodiment of the present invention. In the facsimile machine 1, a CIS (Contact Image Sensor) 11 is supported on a lower cover 15 to be rotatable about a supporting point P, via holders 13 which hold the CIS 11 at both ends in the horizontal direction (direction orthogonal to a face of FIG. 1). The holders 13 are biased upward by compression springs 17, respectively, which results in the upper face of the CIS 11 being urged toward an upper cover 19. The upper cover 19 is configured to be rotatable about a supporting point R together with an operation panel 20. A document to be read may be inserted in and outputted from facsimile machine 1 in the direction indicated by arrow 3, while a document (e.g., an incoming facsimile) may be printed and outputted in the direction indicated by arrow 5.

Figure 2:
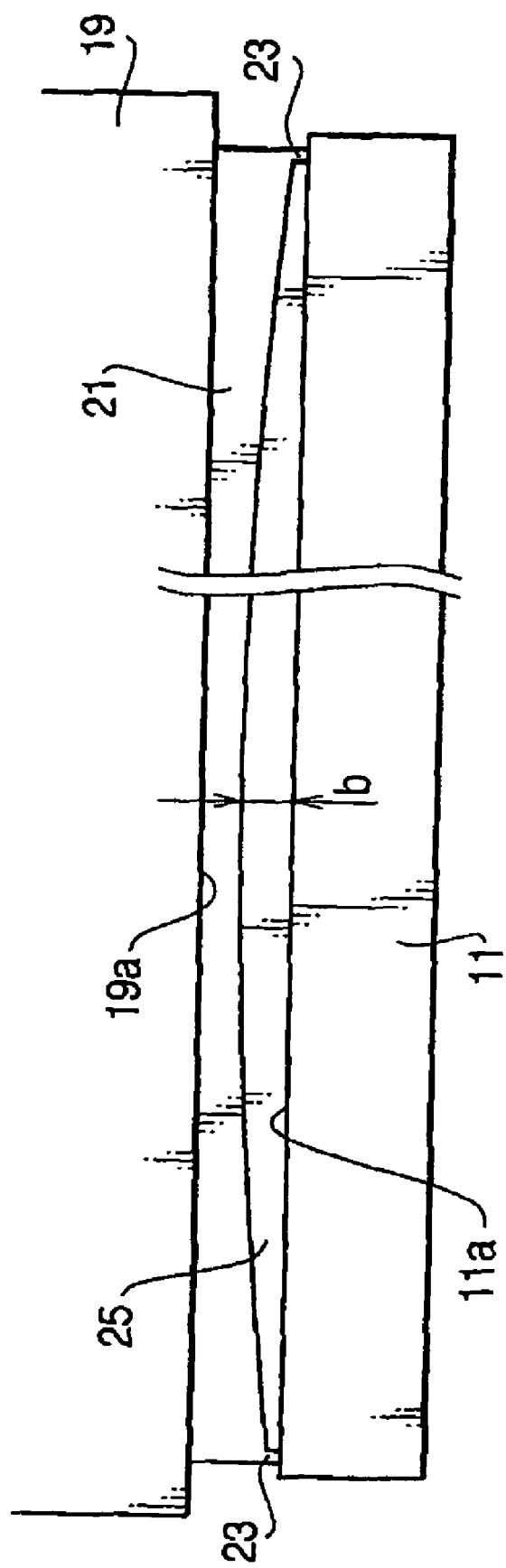
FIG. 2 schematically shows a cross-sectional view of a CIS (Contact Image Sensor) and a rib of the facsimile machine taken along the line A-A shown in FIG. 1.

FIG. 2 is a cross-sectional view of a part of the facsimile machine 1 around the CIS 11 taken along line A-A shown in FIG. 1. In FIG. 2, details of components like the holders 13 are omitted, the scale in the vertical direction is enlarged, and part of the structure between wavy lines is omitted. A rib 21 is formed on the lower face of the upper cover 19 so that projections 23 at both ends of the rib 21 make contact with the upper face 11a of the CIS 11, which results in a feeding path 25 for the document being provided and soft paper being fed by a pair of feeding rollers 27 and 28 (see FIG. 1) smoothly along the feeding path 25 between the upper cover 19 and the CIS 11. The height of the feeding path 25 is 0.45 mm at positions beside the projections 23 and 0.65 mm at the center of the CIS 11.

FIG. 3 is a plan view of the lower cover 15. Two support shafts 31 serving as the supporting points P for the rotation of the holders 13 are placed at the front (bottom of FIG. 3) of the lower cover 15 to be coaxial with each other. The reference numerals "33" denote a pair of spring supports to which the compression springs 17 for biasing the holders 13 (not shown in FIG. 3) are attached.

Figure 4A:
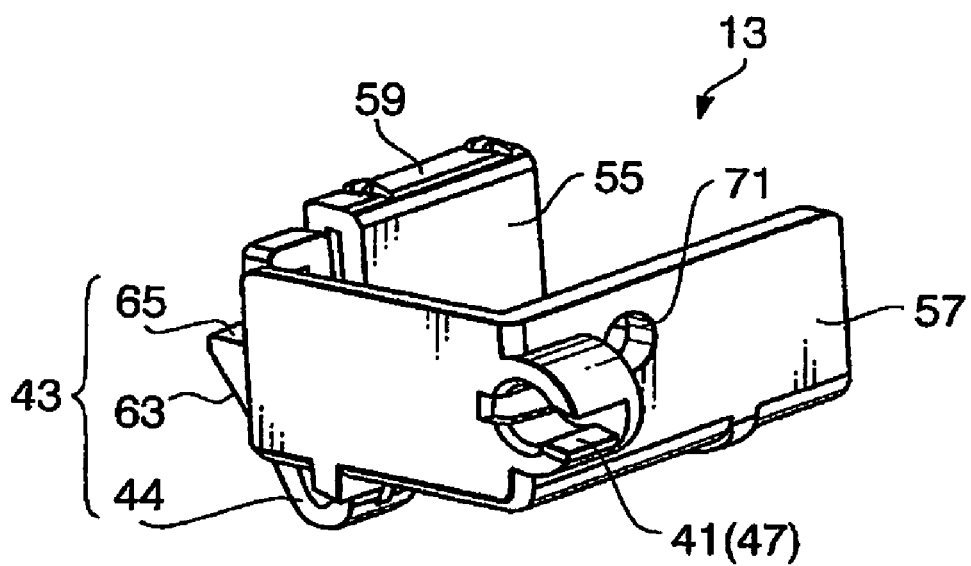
FIGS. 4A and 4B are perspective views each showing a structure of a holder of the facsimile machine shown in FIG. 1.
Figure 4B:
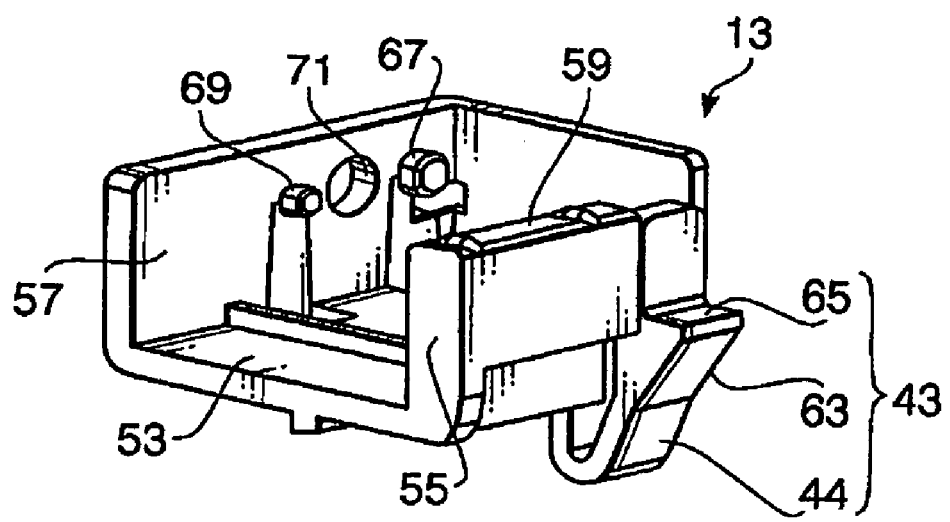

FIGS. 4A and 4B are perspective views showing the structure of the holders 13. Two holders 13 are provided, one to each end of the CIS 11 in the horizontal direction (horizontal direction in FIG. 2) corresponding to one of the two support shafts 31 (see FIG. 5B). In FIGS. 4A and 4B, one of the holders 13 that is on the right-hand side is shown in different view angles, respectively. The other holder 13 on the left-hand side has a shape substantially plane symmetrical to the holder 13 shown in FIGS. 4A and 4B. Each holder 13, made of synthetic resin, has a base 53 (on which the CIS 11 is mounted) and a pair of walls 55 and 57 extending upward from the base 53 to face each other. The two walls 55 and 57 facing each other are arranged to be parallel to the feeding direction of the document. The upper edge 59 of the wall 55 (on the downstream side in the document feeding direction) is formed to be able to make contact with the document to support the document. Next to the wall 55, an engaging part 43 having a configuration described below is formed.

The engaging part 43 includes an inclined face 63 which can make contact with an engaged part 45 (see FIG. 1) and a regulating face 65 which can engage with the engaged part 45 for restricting the rotating position of the CIS 11 after the engaged part 45 has climbed over the inclined face 63. The engaging part 43 is capable of moving toward the inside of the holder 13 and returning to the original position by the resiliency of a spring part 44 formed integrally with the engaging part 43. In short, the engaging part 43 is configured as an elastic arm part.

On the wall 57 (on the upstream side in the document feeding direction), a holding part 41 is formed. The holding part 41 holds a corresponding one of the support shafts 31, which results in the whole holder 13 being supported rotatably about the support shaft 31 defining the rotation axis (supporting point P shown in FIG. 1) together with the CIS 11. During rotation, the engaging part 43 (FIGS. 4A and 4B) engages with the engaged part 45 (FIG. 1) formed on the lower cover 15 to have a hook-like shape, which restricts the rotation angle of the holder 13. On the inner surface of the wall 57, bosses 67 and 69 are formed to be engaged with holes (explained later) of the CIS 11. A hole 71 is formed through the wall 57 for attaching, e.g., screwing, the holder 13 to the CIS 11.

Figure 5A:
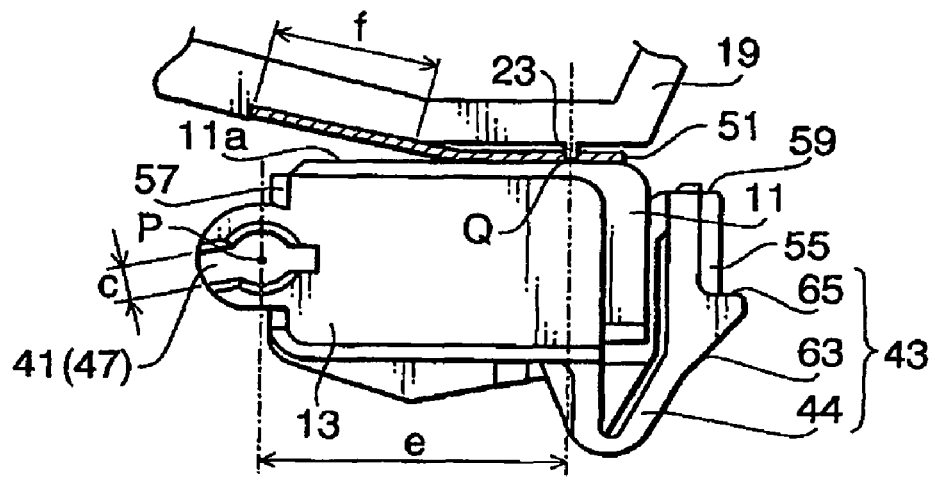
FIGS. 5A and 5B are explanatory drawings showing a mechanism for rotatably supporting the CIS.
Figure 5B:
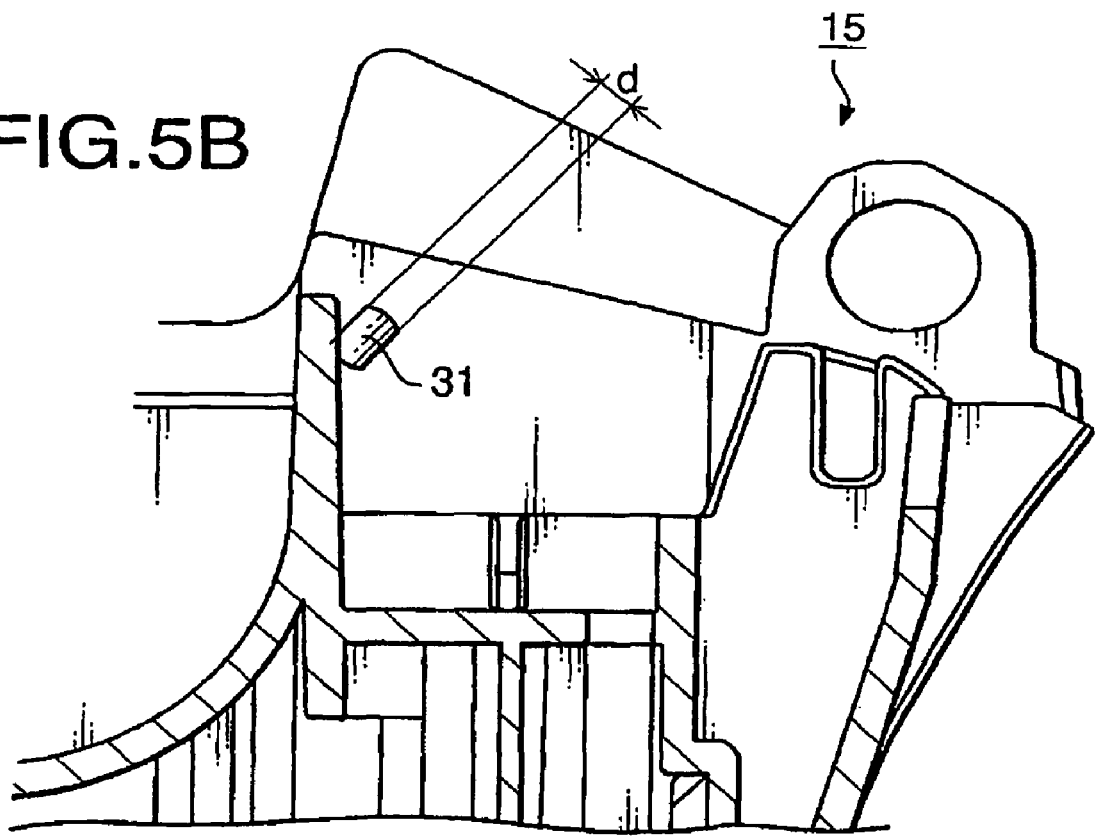

FIG. 5A is a left side view showing the left holder 13 together with the CIS 11 and the upper cover 19. FIG. 5B is a central cross-sectional view of the lower cover 15. The holding part 41 has a sectional form like "C" as shown in FIG. 5A. The width c of an opening 47 of the holding part 41 is 2.6 mm. The internal diameter of the holding part 41 is 4.05 mm. Meanwhile, the support shaft 31 has a sectional form (in a plane orthogonal to its central axis) like an ellipse which is made by removing two peripheral parts from a circle along two parallel lines the same distance from the central axis, as shown in FIG. 5B. The distance d between the two parallel lines (hereinafter referred to as the "width" of the support shaft 31) is 2.5 mm. The external diameter of the circle defining longitudinal sides of the support shaft is 3.95 mm. Thus, the width c of the opening 47 is set to be slightly greater than the width d of the support shaft 31, and the internal diameter of the holding part 41 is set to be slightly greater than the external diameter of the support shaft 31. To attach the holder 13 to the support shaft 31 to be rotatably supported by the support shaft 31, the holder 13 is held so that the widthwise direction of the opening 47 will be parallel to that of the support shaft 31, and the support shaft 31 is put in the holding part 41 through the opening 47. By rotating the holder 13 clockwise in FIG. 5A until the engaging part 43 engages with the engaged part 45 (see FIG. 1), the holder 13 is rotatably supported by the support shaft 31, which can restrict the rotation of the holder 13 in the counterclockwise direction. As above, the holders 13 (together with the CIS 11) can be attached to the lower cover 15 with ease.

In the state of FIG. 5A in which the upper cover 19 is closed, the CIS 11 is pushed by the aforementioned projections 23 downward, letting the holders 13 rotate further in the clockwise direction, which causes the engaging part 43 and the engaged part 45 to separate from each other. On a part of the upper cover 19 facing the CIS 11, a white tape 51 is applied. The white tape 51 is an elastic white member fixed on the upper cover 19 and serving as a platen. Specifically, a part of the white tape 51 is adhered onto an inclined surface "f" of the upper cover 19 at a position slightly on the upstream side in the document feeding direction, allowing the other part of the white tape 51 to move freely at an image reading position Q of the CIS 11. When the upper cover 19 is closed with no document existing between the upper cover 19 and the CIS 11, part of the white tape 51 near its free end contacts the image reading position Q, which causes a white image to be read and recognized by an image reading unit. When the document is read, it is fed to the image reading position Q between the white tape 51 and the CIS 11 lifting the white tape 51 upward.

At the image reading position Q of the CIS 11, image pickup devices are arranged in a direction orthogonal to a face of FIG. 5A. Since the image pickup devices are situated on the downstream side of the holding parts 41 (rotation axis P of the CIS 11) in the document feeding direction, the friction between the document and the CIS 11 serves as a slight force rotating the CIS 11 in a direction separating from the projections 23 (rib 21), which results in the document being fed smoothly. Further, since the CIS 11 is attached to the holders 13 providing a long distance e from the rotation axis P of the CIS 11 to the image reading position Q (not shortening the distance e by horizontally flipping the CIS 11 in FIG. 5, for example), the image pickup devices at the image reading position Q are not tilted much even when the holders 13 rotate, which results in stable image reading being realized irrespective of the thickness of the document.

Figure 6A:
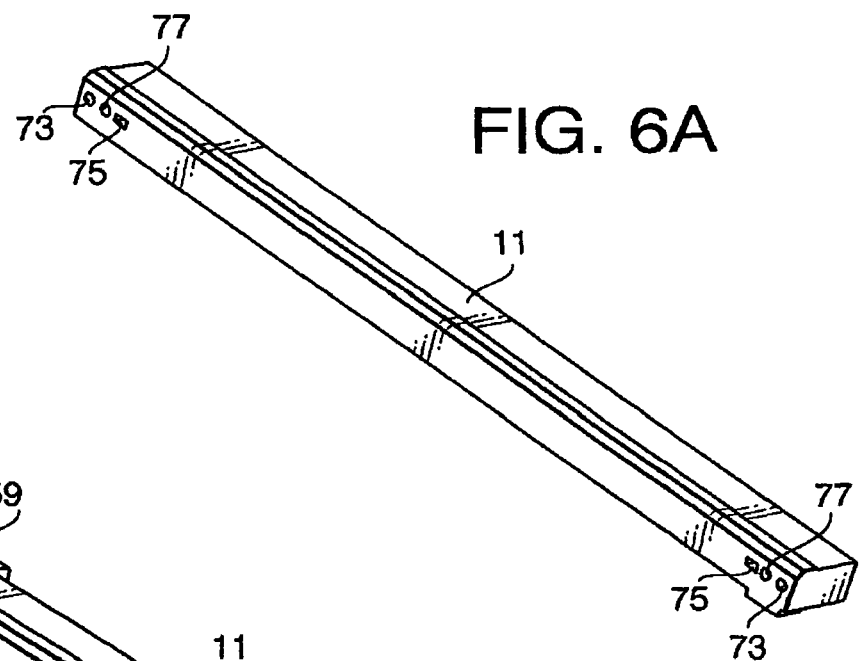
FIG. 6A through 6C are perspective views showing the CIS and a state in which the holders have been attached to the CIS.
Figure 6B:
Figure 6C:
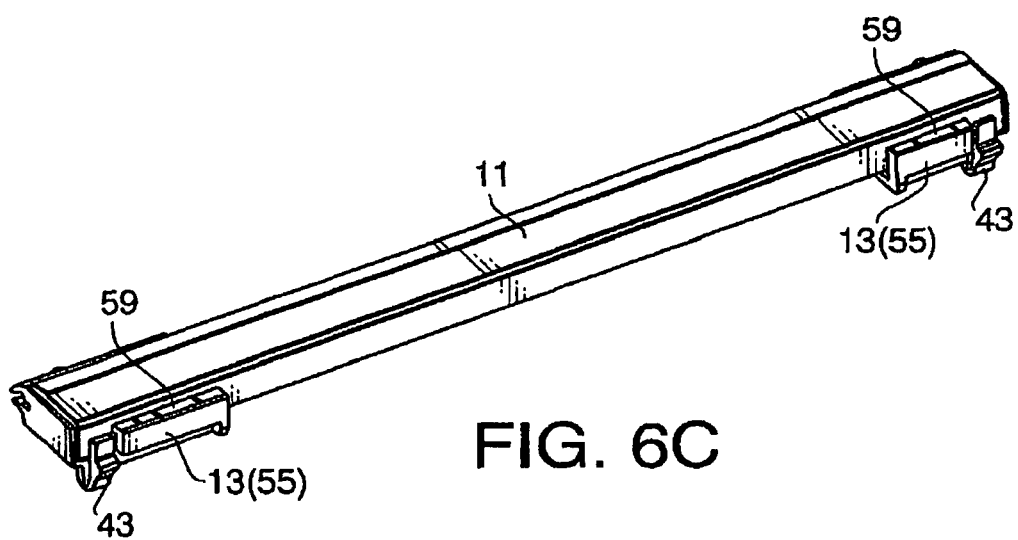
Figure 7:
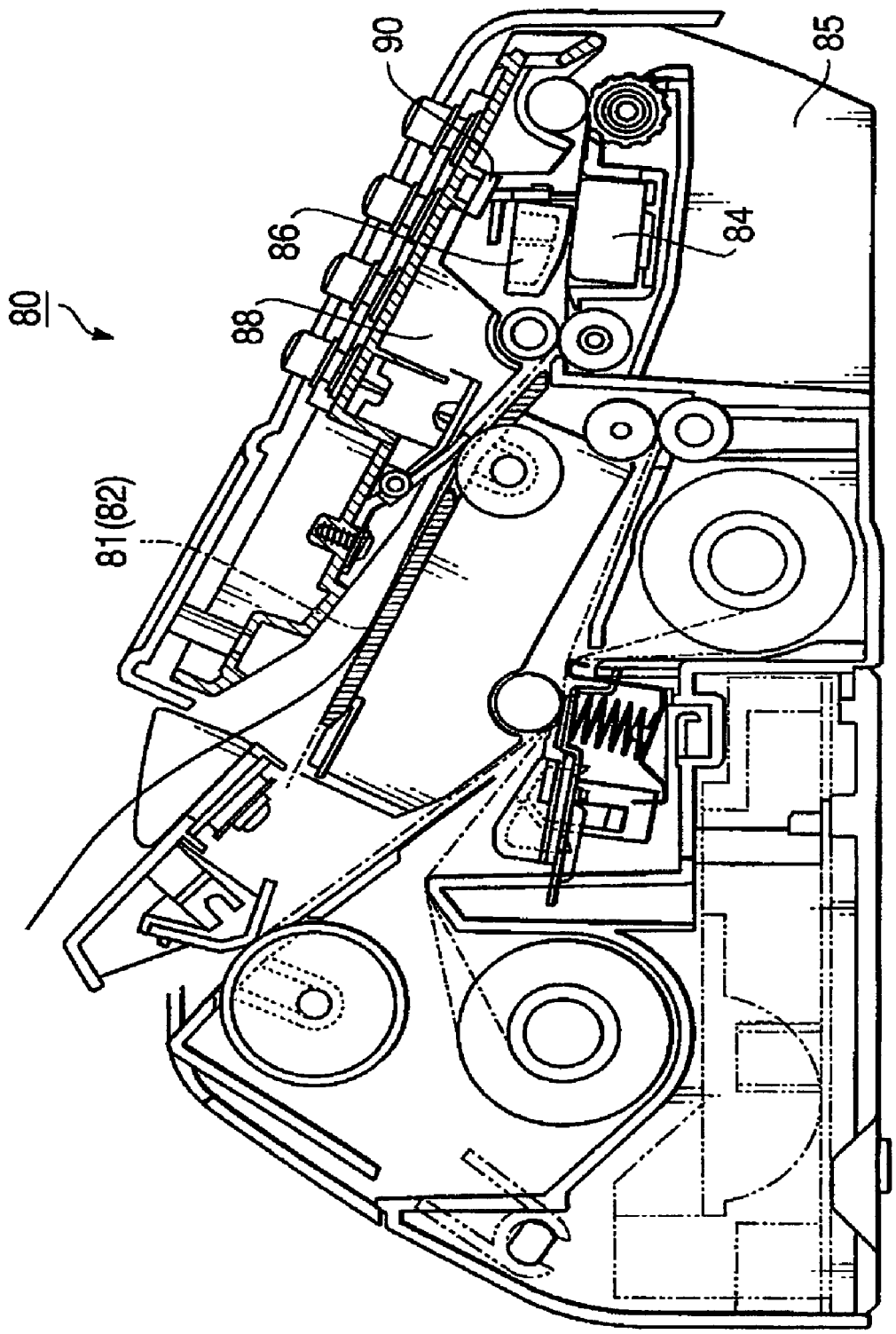
FIG. 7 is a central cross-sectional view showing an internal configuration of a conventional facsimile machine.

FIG. 6A is a perspective view of the CIS 11. FIG. 6B is a perspective view showing a state in which the holders 13 have been attached to the CIS 11. FIG. 6C is a perspective view of the CIS 11 with the holders 13 from a different perspective. At each end of a side face of the CIS 11, engagement holes 73 and 75 (into which the bosses 67 and 69 of a corresponding holder 13 are inserted respectively) and a screw hole 77 are formed. The holders 13 are attached to the CIS 11 through the engagement holes 73 and 75 and the screw holes 77 as shown in FIGS. 6B and 6C.

In the facsimile machine 1 described above, the CIS 11 is supported by the holders 13 and the support shafts 31 to be movable toward the upper cover 19 (rib 21) and is biased toward the rib 21 by the compression springs 17. In this configuration, the rib 21 for holding the document is not required to be installed as a movable component and there is no need to provide a space for allowing the movement of the rib 21 or providing the upper cover 19 with a mechanism for letting the rib 21 be movable. Thus, there is no need to increase the size of the upper cover 19.

Further, the CIS 11 is installed to be rotatable by the support shafts 31 and the holding parts 41, which simplifies the configuration. Also, the CIS 11 can be moved toward the rib 21 smoothly, and the positioning of the CIS 11 can be made with ease.

The supporting point R of the openable/closable upper cover 19 is situated on the upstream side of the CIS 11 in the document feeding direction. Therefore, the friction between the document and the rib 21 serves as slight force rotating the upper cover 19 (rib 21) in a direction separating it from the CIS 11, which results in the document being fed smoothly.

Since both ends of the CIS 11 are supported by a pair of holders 13, the parallel relationship between the CIS 11 and the pair of feeding rollers 27 and 28 can be ensured easily. The feeding rollers 27 and 28 are situated on the downstream side of the CIS 11 in the document feeding direction. The document after being read by the image pickup devices of the CIS 11 is first supported by the upper edges 59 of the walls 55 of the holders 13 situated on the downstream side of the CIS 11 in the document feeding direction and then fed by the pair of feeding rollers 27 and 28, which prevents the document from being fed to improper positions and results in the image reading, supporting and feeding of the document being carried out with high stability, The CIS 11 can be attached to the lower cover 15 with ease. By rotating the CIS 11 in a direction against the biasing force of the compression spring 17, the engaged parts 45 of the lower cover 15 make contact with the inclined faces 63 of the engaging parts 43 of the holders 13 and then climb over the inclined faces 63, which engages the regulating faces 65 of the engaging parts 43 with the engaged parts 45 and thereafter restricts the rotating position of the CIS 11. The attachment of the CIS 11 to the lower cover 15 is completed easily as above.

Since the pickup devices of the CIS 11 are situated on the downstream side of the holding parts 41 in the document feeding direction, the friction between the document and the CIS 11 serves as a slight force rotating the CIS 11 in a direction separating from the rib 21, which results in the document being fed smoothly.

Since the CIS 11 and the holders 13 are joined together using the bosses 67 and 69 (or engagement holes) formed on the walls 57 of the holders 13 and the engagement holes 73 and 75 (or bosses) formed on the CIS 11, the joining of the CIS 11 and the holders 13 can be carried out with ease. Since the walls provided with the bosses (or engagement holes) are the walls 57 situated on the upstream side in the document feeding direction (not the walls 55 on the downstream side supporting the document with their upper edges 59), the configuration of the holders 13 can be simplified Letting the holding part 41 hold the support shaft 31 is completed easily, by engaging the part of the support shaft 31 having the elliptical sectional form with the opening 47 of the holding part 41.

Since a prescribed clearance is formed between the rib 21 and the CIS 11 by the projections 23 of the rib 21, soft paper can be fed more smoothly compared to cases where no clearance is formed. The distance between the CIS 11 and the document is maintained by the rib 21 within the depth of field of the CIS 11. The clearance realizing smooth feeding of soft paper can be formed with such a simple configuration (i.e. projections 23).

While a description has been given above of an illustrative embodiment in accordance with the present invention, the present invention is not to be restricted by the particular illustrative embodiment and a variety of modifications, design changes, etc. are possible without departing from the scope and spirit of the present invention described in the appended claims. For example, the image reading device of the present invention, configured as a facsimile machine 1 in the above embodiment, may also be implemented as a copier, scanner, etc.

The image reading unit is not restricted to the CIS 11, as other devices may also be employed. While the white tape 51 is used as the white member in the above facsimile machine 1, the white member may also be implemented by a white plate-like member, the upper cover 19 painted white, etc.

What is claimed is:

1. An image reading device configured to read an image formed on a document being fed, comprising:
    a cover portion configured to cover an interior of a main body when closed, wherein the main body is separate from the cover portion, and wherein the cover portion is further configured to provide access to the interior of the main body when open, the cover portion including:
        a document holder at least partially overlaying a surface of an image reading unit when the cover portion is closed, wherein the document holder is configured to hold the document being fed between the image reading unit and the document holder, and wherein the document holder is immovable relative to the cover portion; and
    the main body rotatably attached to the cover portion, the main body including:
        the image reading unit configured to read the image formed on the document and to be immovable along a document feeding path,
        a supporting mechanism supporting the image reading unit and configured to be movable toward the document holder, wherein a holding part of the supporting mechanism is held by a holder attached to the image reading unit and wherein an engaging part protrudes from the holder,
        a biasing unit configured to bias the image reading unit toward the document holder, and
        an engaged part coupled to the main body of the image reading device, wherein the engaged part is configured to restrict a rotating position of the image reading unit by engaging the engaging part when the document holder is open and apart from the image reading unit,
    wherein the engaging part includes an elastic arm part provided to the holder to adjoin a wall of a frame receiving part situated on a downstream side in a document feeding direction, and wherein the elastic arm part includes an inclined face capable of making contact with the engaged part and a regulating face capable of engaging with the engaged part to restrict the rotating position of the image reading unit, and
    wherein the engaued part includes an arm attached to and extending vertically upward from the main body and a hook-like structure extending substantially horizontally from a top portion of the arm, wherein the hook-like structure engages the regulating face of the engaging part.

2. The image reading device according to claim 1, wherein the document holder is provided with a white member that allows the image reading unit to read a white color.

3. The image reading device according to claim 1, wherein the supporting mechanism includes:
    a support shaft coupled to the main body of the image reading device, the support shaft extending in a direction orthogonal to the document feeding direction and configured to support the image reading unit.

4. The image reading device according to claim 3, wherein:
    the holder is directly fixed on the image reading unit and is configured to hold the image reading unit; and
    the engaging part protrudes from a side of the holder opposite to the holding part with respect to the image reading unit.

5. The image reading device according to claim 4, wherein:
    the image reading unit includes image pickup devices arranged in a direction orthogonal to the document feeding direction, and
    the holding part is placed on an upstream side of the image pickup devices in the document feeding direction.

6. The image reading device according to claim 5, further comprising a pair of feeding rollers fixed to the main body of the image reading device to feed the document, wherein:
    the image reading unit includes a reading frame extending in a direction orthogonal to the document feeding direction, and
    the holder includes a pair of frame receiving parts holding both ends of the reading frame in the direction orthogonal to the document feeding direction.

7. The image reading device according to claim 6, wherein:
    each of the frame receiving parts includes a base on which each end of the reading frame is mounted and a pair of walls extending upward from the base to face each other in the document feeding direction, and
    one of the walls situated on the downstream side in the document feeding direction has an upper edge formed to be able to make contact with the document to support the document.

8. The image reading device according to claim 7, wherein the pair of feeding rollers is placed on the downstream side of the walls of the frame receiving parts situated on the downstream side in the document feeding direction to adjoin the walls.

9. The image reading device according to claim 7, wherein the wall of each frame receiving part situated on the upstream side in the document feeding direction and each end of the reading frame are joined together with a boss formed on one of the wall and the end of the reading frame and an engagement hole formed on the other of the wall and the end of the reading frame to engage with the boss.

10. The image reading device according to claim 3, wherein:
    the support shaft has an elliptical sectional form, in a plane orthogonal to its central axis, and the holding part has an opening capable of engaging with the support shaft having the elliptical sectional form.

11. The image reading device according to claim 3, wherein:
the cover portion is configured to be opened and closed with respect to the main body using a supporting point situated on the same side of the image reading unit as the support shaft in the document feeding direction.

12. The image reading device according to claim 1, further comprising a clearance forming structure which forms a clearance between the document holder and the image reading unit.

13. The image reading device of claim 12, wherein the clearance forming structure includes a pair of projections integrally formed on the document holder that make contact with a reading surface of the image reading unit when the cover portion is closed.

14. The image reading device of claim 13, wherein a first height of a clearance between a first portion of the document holder proximate to, but not including, each of the pair of projections and the reading surface is less than a second height of a clearance between a second portion of the document holder at a mid-point between the pair of projections and the reading surface.

15. An image reading device configured to read an image formed on a document being fed, comprising:
an image reading unit configured to read the image formed on the document;
a document holder placed to face the image reading unit configured to hold the document being fed, between the image reading unit and the document holder;
a supporting mechanism which supports the image reading unit and is configured to be movable toward the image reading unit, wherein a holding part of the supporting mechanism is held by a holder attached to the image reading unit and wherein an engaging part protrudes from the holder;
a biasing unit configured to bias the image reading unit toward the document holder;
a clearance forming structure which forms a clearance between the document holder and the image reading unit, wherein the clearance forming structure is implemented by a pair of projections integrally formed on the document holder to be able to make contact with a reading surface of the image reading unit; and
an engaged part coupled to a main body of the image reading device, wherein the engaged part is configured to restrict a rotating position of the image reading unit by engaging the engaging part when the document holder is open and apart from the image reading unit,
wherein the engaging part includes an elastic arm part provided to the holder to adjoin a wall of a frame receiving part situated on a downstream side in a document feeding direction, and wherein the elastic arm part includes an inclined face capable of making contact with the engaged part and a regulating face capable of engaging with the engaged part to restrict the rotating position of the image reading unit, and
wherein the engaged part includes an arm attached to and extending vertically upward from the main body and a hook-like structure extending substantially horizontally from a top portion of the arm, wherein the hook-like structure engages the regulating face of the engaging part.

16. An image reading device that reads an image formed on a document being fed, comprising:
a lower body;
an upper body rotatably attached to the lower body at a supporting point, wherein the upper body is configured to open and close with respect to the lower body, a part of a path of the document being defined between the upper body and the lower body;
an image reading unit coupled to the lower body, wherein the image reading unit is immovable along the path of the document and wherein the image reading unit is supported by a supporting mechanism including a holding part, wherein the holding part is held by a holder attached to the image reading unit and wherein an engaging part protrudes from the holder;
a platen member coupled to the upper body, the document being nipped between the image reading unit and the platen when the image is read, wherein the platen member is immovable relative to the upper body when the device reads the image formed on the document being fed and wherein the platen member at least partially overlays the image reading unit when the upper body is closed;
a biasing unit, coupled to the lower body, and configured to bias one of the imaging reading unit toward the platen member; and
an engaged part coupled to the lower body and configured to restrict a rotating position of the image reading unit by engaging the engaging part when the upper body is open and apart from the image reading unit,
wherein the engaging part includes an elastic arm part provided to the holder to adjoin a wall of a frame receiving part situated on a downstream side in a document feeding direction, and wherein the elastic arm part includes an inclined face capable of making contact with the engaged part and a regulating face capable of engaging with the engaged part to restrict the rotating position of the image reading unit, and
wherein the engaged part includes an arm attached to and extending vertically upward from the lower body and a hook-like structure extending substantially horizontally from a top portion of the arm, wherein the hook-like structure engages the regulating face of the engaging part.

* * * * *